June 16, 1953
P. T. SCHARF ET AL
2,641,954
PROTECTIVE COATINGS FOR OPTICAL ELEMENTS
AND METHODS FOR APPLYING THEM
Filed May 6, 1950
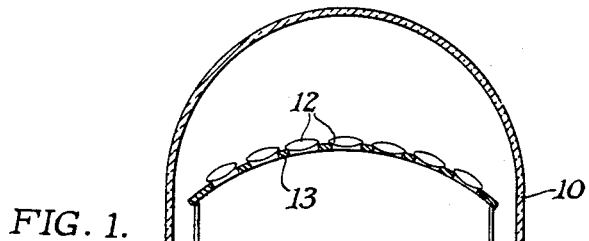
FIG. 1.
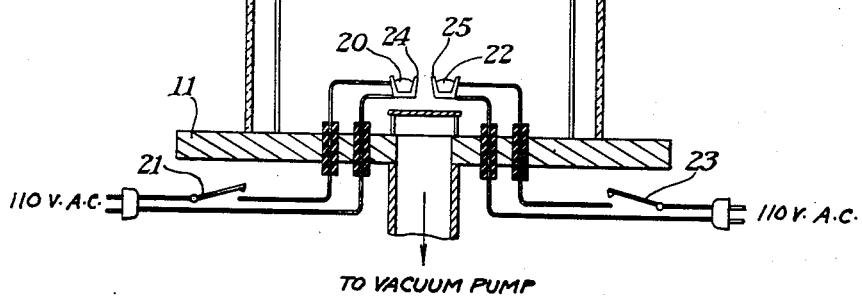
FIG. 2.
FIG. 3.         FIG. 4.
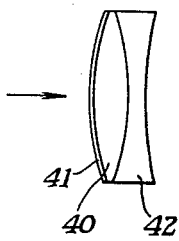 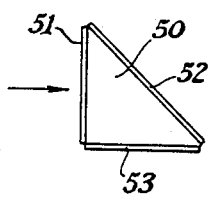
PHILIP T. SCHARF
WILLIAM J. KEENAN
INVENTORS
Daniel J. Mayne
BY T. M. Emerson Holmes
ATTORNEYS Patented June 16, 1953

2,641,954

UNITED STATES PATENT OFFICE 2,641,954

PROTECTIVE COATINGS FOR OPTICAL ELEMENTS AND METHODS FOR APPLYING THEM

Philip T. Scharf and William J. Keenan, Rochester, N. Y., assignors to Eastman Kodak Company, Rochester, N. Y., a corporation of New Jersey Application May 6, 1950, Serial No. 160,508

6 Claims. (Cl. 88—1)

This invention relates to the coating of lenses, prisms and the like to protect the optical surface thereof and is particularly applicable to the protecting of unstable glass, rock salt, calcite, plastics, etc.

The provision of a protective coat for unstable optical materials is not new and it is common to provide a protective surface layer or to cement the unstable element between glass elements which are stable. In some cases an unstable element has one surface cemented to another element and has the other surface protected by a thin coating. It is the object of the present invention to provide an improved coating for such surfaces. In fact, the coating provided by the present invention is useful with all glass objects although it is particularly useful with unstable glass.

It is a further object of the invention to provide a simple process for applying such protective coatings.

According to the present invention the glass object whose surface is to be protected is placed in a vacuum such as the usual bell jar arrangement and the pressure is brought down to a value less than 1 micron of mercury (Hg). Silicon monoxide is then deposited on the surface by sublimation in the vacuum and immediately thereafter, before the silicon monoxide has the opportunity to change appreciably to silicon dioxide, a layer of magnesium fluoride is overcoated on the silicon monoxide, also by vacuum sublimation. The coating of surfaces with silicon monoxide or magnesium fluoride separately is known. The direct combination of these prior processes involves allowing the silicon monoxide to change to silicon dioxide and then heating the coated object to a high temperature in order to insure that the magnesium fluoride overcoating adheres firmly to the silicon dioxide. We have discovered on the other hand that not only can the preheating be dispensed with (thus simplifying the manufacturing operation) but the final double layer is much harder when the magnesium flouride is applied immediately to the silicon monoxide itself. Presumably the silicon monoxide has some type of affinity for the magnesium fluoride which results in great tenacity. We have not determined what percentage of the silicon monoxide still changes to silicon dioxide after the magnesium fluoride is coated thereon and the double layer is exposed to the atmosphere. It may be that some of the under layer remains in the silicon monoxide form in close bond with the magnesium fluoride. What ever the theory, the fact remains that coatings according to the present invention are superior to prior coatings of either material alone and are even superior to coatings of magnesium fluoride over heated silicon dioxide coatings. When appled to optical elements of unstable glass the element should be ground and polished and then the coating should be applied before the polished surface has appreciably deteriorated. This interval of time may be anything from a few minutes to several months depending on the glass and the storage conditions.

These protective coatings can be made of such thickness that they also act as reflection reducing coatings. The thickness of the silicon monoxide is not too critical in this connection. It is preferably a half wave length thick but may have any value exceeding the half wave length. The magnesium fluoride layer should be a quarter wave length thick. The wave length of course is that with respect to which the optical element is to transmit light. In visual instruments for example, it is more important to have reflection reduced for green light than for other colors.

The invention and advantages thereof will be fully understood from the accompanying drawing in which:

Fig. 1 illustrates the coating of lenses according to the present invention.

Fig. 2 is a highly magnified section of an optical element according to the present invention.

Figs. 3 and 4 illustrate practical examples of optical elements protected according to the present invention.

In Fig. 1 a bell jar 10 supported on a table 11 is evacuated in the usual way by pumps not shown to a pressure less than 1 micron Hg. The lenses 12 to be coated are supported on a frame 13 carried on supporting rods 14 by the table 11. The lenses are approximately equi-distant from crucibles from which solid materials are to be sublimed. The material 20 in one of these crucibles consists of silicon monoxide or any of the known mixtures of chemicals from which silicon monoxide sublimes first. Various ways of coating silicon monoxide in vacuum are known and the present invention is not concerned with which of these methods is used. Closing of the switch 21 supplies current to a heater surrounding the crucible 24 so that the silicon monoxide is sublimated and deposits on the under surface of the lenses 12. A second crucible 25 which may be heated by closing a switch 23 carries magnesium fluoride 22.

According to the invention the switch 23 is closed preferably before the sublimation of the silicon monoxide 20 is completed so that the magnesium fluoride 22 sublimes onto the under surfaces of the lenses 12 immediately after the completion of the sublimation of the silicon monoxide. It does not hurt if some of the magnesium fluoride is also coated even before the last of the silicon monoxide is on the lenses 12. The essential point is to have the magnesium fluoride 22 starting to sublime before the silicon monoxide on the lenses 12 has had an opportunity to change appreciably to silicon dioxide. At very low pressures, appreciable time can actually elapse between the termination of the silicon monoxide coating and the start of the magnesium fluoride coating, but the vacuum must be maintained and the longer one waits, the less hard is the finished coating. We prefer not to wait more than a few seconds and it is to be understood that a few seconds (up to a maximum of five minutes) are permissible in providing the "immediate" depositing of the magnesium fluoride according to the invention. It will be noted that no heaters are provided in Fig. 1 for preheating the lenses 12 before either of the coatings are applied or for baking the finished coatings. Standard equipment usually includes such heaters since it is desirable to preheat glass elements when magnesium fluoride is applied directly thereto. In the present invention it is preferable to eliminate all preheating and postbaking steps although they may be used without serving any really useful purpose. The preferred embodiment of the present invention thus operates at relatively low temperature of the glass object, e. g. less than 50° C.

In Fig. 2 a glass element 30 is provided with a silicon monoxide coating 31 over which the magnesium fluoride coating 32 is provided. The present invention is applicable to all types of glass and may be used with advantage wherever reflection reducing coatings are needed. On the other hand, it is particularly applicable to the protection of the surfaces of unstable glass, whether reflection reducing coatings are required thereon or not. It is also applicable to optical elements of rock salt, calcite, plastics etc. but most commercial uses of the invention are in connection with unstable glass elements. It should be pointed out that many unstable glasses have highly desirable optical properties such as special indices of refraction, dispersion, partial dispersion etc. and therefore it is desirable to be able to use such glasses in optical elements. In Fig. 2 the silicon monoxide layer is parenthetically indicated as changing to silicon dioxide. This does not mean that any of the silicon monoxide necessarily changes or that all of it so changes eventually. Whether any or all of its so changes is not known, but the parenthetical change is indicated since it is distinctly possible that at least some of the silicon monoxide does change to silicon dioxide even after the magnesium fluoride is coated thereon if it has not previously so changed. The essential feature of the present invention is the application of the magnesium fluoride on the silicon monoxide before any appreciable change to silicon dioxide has occurred.

For reflection reducing purposes the layer 31 is preferably a half-wave length and the layer 32 is preferably a quarter wave length thick.

In Fig. 3 an unstable glass element 40 is protected on one side by being cemented to a stable glass element 42 and is protected on the other side by a double layer 41 according to the present invention.

In Fig. 4 a prism 50 is protected on all three optical surfaces by layers 51, 52 and 53 according to the present invention. In both cases the unstable glass base has all of its light transmitting surfaces ground, polished and protected by transparent solid materials. At least one of the surfaces (41 in Fig. 3, 51 and 53 in Fig. 4) is protected by a double layer made according to the present invention. The invention is not limited to these specific examples but is of the scope of the appended claims.

We claim:

1. The method of applying a protective coating to the surface of a glass object which comprises placing the object in a vacuum at a pressure less than 1 micron Hg, depositing silicon monoxide on the surface by vacuum sublimation and then immediately after the completion of said depositing and while maintaining the coated object in said vacuum, depositing magnesium fluoride on the silicon monoxide by vacuum sublimation.

2. The method according to claim 1 in which the object is maintained at a temperature less than 50° C. during said depositing steps.

3. The method according to claim 1 to give a protective coating which is also a reflection reducing one, with respect to light of wavelength $\lambda$, in which method the silicon monoxide depositing continues until the thickness of silicon monoxide exceeds $\lambda/2$ and in which the magnesium fluoride depositing continues until the thickness of magnesium fluoride approximately equals $\lambda/4$.

4. The method according to claim 1 applied to unstable glass which includes the step of grinding and polishing said surface an interval of time before said placing in a vacuum, less than that in which appreciable deterioration of the surface occurs.

5. An optical element comprising a base consisting of unstable glass which deteriorates upon exposure to the atmosphere, said element having all light transmitting surfaces ground, polished and protected by transparent solid materials, the protective material on at least one of said surfaces consisting of a layer of silicon monoxide sublimed on the surface in a vacuum at a pressure less than one micron Hg and a layer of magnesium flouride sublimed on the layer of silicon monoxide in the same vacuum and before the latter has appreciably changed to silicon dioxide.

6. An optical element according to claim 5 in which the silicon monoxide layer is a half wavelength thick and the magnesium fluoride layer is a quarter wavelength thick relative to green light.

PHILIP T. SCHARF.
WILLIAM J. KEENAN.

References Cited in the file of this patent

UNITED STATES PATENTS

| Number | Name | Date |
|---|---|---|
| 1,989,824 | Rennie | Feb. 5, 1935 |
| 2,281,474 | Cartwright et al. | Apr. 28, 1942 |
| 2,331,716 | Nadeau et al. | Oct. 12, 1943 |
| 2,337,460 | French | Dec. 21, 1943 |
| 2,386,875 | Morgan | Oct. 16, 1945 |
| 2,391,595 | Richards et al. | Dec. 25, 1945 |
| 2,427,592 | Dimmick | Sept. 16, 1947 |
| 2,432,484 | Moulton | Dec. 9, 1947 |
| 2,432,538 | Ogle et al. | Dec. 16, 1947 |
| 2,456,899 | Strong | Dec. 21, 1948 |
| 2,478,385 | Gaiser | Aug. 9, 1949 |
| 2,561,077 | Tilton | July 17, 1951 |